United States Patent [19]

Breslin

[11] Patent Number: 4,761,225

[45] Date of Patent: Aug. 2, 1988

[54] APPARATUS FOR CONTROLLING THE REMOVAL OF LIQUID HYDROCARBONS FROM GROUNDWATER

[76] Inventor: Michael K. Breslin, 1615 Vendola Dr., San Rafael, Calif. 94903

[21] Appl. No.: 897,012

[22] Filed: Aug. 18, 1986

[51] Int. Cl.[4] ............... B01D 17/02; F04F 3/00; E21B 43/38

[52] U.S. Cl. ................... 210/104; 210/117; 210/121; 210/136; 210/242.3; 210/923; 417/118; 417/138; 166/265

[58] Field of Search ............... 210/923, 921, 104, 103, 210/98, 109, 115, 117, 121, 136, 138, 242.3, 744, 776; 417/118, 138, 143; 166/265

[56] References Cited

U.S. PATENT DOCUMENTS

| | | | |
|---|---|---|---|
| 4,181,470 | 1/1980 | Gillett | 417/138 |
| 4,273,650 | 6/1981 | Soloman | 210/923 |
| 4,307,525 | 12/1981 | Maloblocki | 417/138 |
| 4,431,534 | 2/1984 | Gordon | 210/923 |
| 4,469,170 | 9/1984 | Farmer, Jr. | 166/265 |
| 4,527,633 | 7/1985 | McLaughlin et al. | 417/118 |
| 4,625,807 | 12/1986 | Harlow | 210/104 |

*Primary Examiner*—Richard V. Fisher
*Assistant Examiner*—Richard D. Jordan

[57] ABSTRACT

An apparatus for controlling the removal of liquid hydrocarbons from ground water in perforated well casings consists of a plurality of pump chambers and a control system which is powered by compressed air. The pump chambers are positioned above a liquid hydrocarbon recovery device which is positioned in the well casing at the oil/water interface. The pump chambers are evacuated, causing the ground water and the liquid hydrocarbons to be drawn into separate chambers through respective check valves. The pump chambers are then pressurized with air to push out the water and liquid hydrocarbons through check valves in the chamber discharge conduits, thereby removing the fluids from the well casing.

7 Claims, 4 Drawing Sheets

APPARATUS FOR CONTROLLING THE REMOVAL OF LIQUID HYDROCARBONS FROM GROUNDWATER

BACKGROUND—FIELD OF THE INVENTION

This invention relates to the recovery of liquid hydrocarbons (oils) which reside underground on top of ground water. The liquid hydrocarbons are present in such a state usually because of an unintentional oil spill from a storage tank or other facility.

BACKGROUND—CROSS REFERENCE TO RELATED APPLICATIONS

My previous patents which relate to the present invention include U.S. Pat. No. 4,497,370, Feb. 5, 1985, titled "Apparatus And Method For Recovery of Liquid Hydrocarbons From Ground Water" and U.S. Pat. No. 4,663,037, May 5, 1987, entitled "Apparatus For Recovery Of Liquid Hydrocarbons From Ground Water".

BACKGROUND—PRIOR ART

Heretofore underground oil spill recovery systems installed in wells have used two electric submersible pumps to draw down the water table and create a "cone of depression" in the groundwater and to remove floating hydrocarbons. This "cone" produced by the first electric pump funnels the oil floating on the groundwater to the apex of the "cone" where it is recovered via a the second electric submersible pump. The system includes a series of float switches to sense the relative levels of oil and water and to energize the appropriate pump. Both pumps and their controls are electric and thus present a hazard when handling gasoline or other flammable oils The system also requires a well having a 6- to 12-inch-diameter casing and significant length of well casing below the fluid level in which the pumps can reside. Such an oil recovery system is disclosed in Solomon U.S. Pat. No. 4,273,650.

Another underground oil spill recovery system used is installed in one well, and uses an electric submersible water pump to draw down the water table to create a "cone of depression" in the groundwater table and thus allows oil to be drawn into the well. A floating oil recovery unit is then used to remove the oil from the well. The floating oil recovery unit uses a semipermeable membrane which allows oil to pass but blocks the flow of water. Floats inside the unit electronically sense the presence of oil and actuate a pump located above and out of the well to remove the oil. Both pumps and their controls are electric and thus present a hazard when handling gasoline or other flammable oils. This system requires a well casing having an inside diameter of approximately 24 inches and a significant length of well casing below the fluid level in which the pumps can reside. the floating oil skimming system is disclosed in U.S. Pat. No. 4,243,529 to Strauss, Jan. 6, 1981.

None of the oil recovery systems described above discloses apparatus and a method for recovering liquid hydrocarbons from an underground site atop ground water by using pneumatically operated controls and pumps to draw the liquids up into a chamber and then push them to the surface. Such a system eliminates the use of electricity and thus decreases the danger of sparking. Such a system also reduces the length of well casing needed below the fluid level. Since the level of required well casing is reduced, so is the cost of installing a well. Thus the proposed system improves the art and reduces costs associated with the art.

None of the prior art systems are designed to function in small (2 to 4 inch) diameter wells which can be quickly and inexpensively installed. None of the above systems are designed to be used in a multitude of wells which are systematically drawn up from in a prearranged sequence and controlled by a central, automatic control station. Because of the foregoing drawbacks, a need has arisen for improvements in the recovery of liquid hydrocarbon residing on groundwater due to spillage or other reasons.

SUMMARY OF THE INVENTION

The present invention fills the aforesaid need by providing an improved apparatus and method for recovery of liquid hydrocarbons which have escaped from storage tanks and other facilities into the ground and reside on the top of groundwater. In the invention, recovery of liquid hydrocarbons is made from one or a multitude of wells. The invention requires no electronic sensors or switches in a well; thus, the probability of fire or explosion in a well due to electronic circuitry is eliminated. Since each well, in the practice of the invention, is relatively small, a substantial volume of volatile material cannot accumulate in the wells and damage from a fire or explosion, if one does occur in such a small well, would be far less than that resulting from a fire or an explosion in a larger well.

In carrying out the method of the present invention, one or a number of perforated well casings are installed in the ground in the area where the underground liquid hydrocarbons reside so that the hydrocarbons and groundwater may enter the wells.

The perforations in each well casing extend a distance above and below the ground water level to allow water and oil to enter the well. Pump chambers and hydrocarbon recovery unit is placed in each well. The tubing for ground water recovery, hydrocarbon recovery, delivery of pressurized gas and the like is fed up and out of the well to a central control station and to a hydrocarbon storage tank at ground level. At the control station, selection can be made as to which well will be drawn upon at what time and for how long. The selection process can be determined by a timer and a series of remotely actuated valves controlled by the timer. The valves are located in the controls a distance from the wells. Liquid hydrocarbons and groundwater are drawn up through the recovery unit into the pump canisters by suction, and then pressurized gas is directed through the valves to individual wells to push the liquid hydrocarbons from the wells to the storage reovery tank at ground level In the present invention, small diameter wells and individual recovery units in the walls are inexpensive to produce and maintain. Also, they are easily installed and a number of them can be quickly installed in proximity to each other over a given area. This feature provides a distinct advantage over prior art systems since the cost of labor and materials used to install a number of small (2- to 4-inch) diameter wells is less than that for labor and materials used to install one relatively large (6- to 24-inch) diameter well of prior art systems.

The conventional practice of well installation requires an annulus between the well casing and the earthen sides of the surround bore hole. This annulus is filled with a very permeable material such as gravel or sand; thus, a bore hole 3 to 12 inches larger in diameter than the outside diameter of the well casing is required. The diameter of the bore hole is generally 50 to 100 percent larger than the diameter of the well casing. Thus, a 6-inch-diameter well casing requires a 10- to 12-inch-diameter bore hole. Further, a 24-inch-diameter well casing usually requires a 36-inch-diameter bore hole. To drill such large bore holes requires very large, continuous flight augers or the use of a casing or drilling fluid to maintain an open bore hole while using a bucket rig to remove the soil. If the soil is not stable as in the case of running sand, a continuous flight auger cannot be used since the removal of soils without a casing would cause more soil to flow to the auger which would eventually cause an undermining of the ground on which the drill rig is operating.

In contrast to the use of relatively large diameter wells, small (2- to 4-inch) diameter wells can be easily installed, even in very sandy soils, using commercially available hollow stem augers of 4- to 8-inch inside diameters. The bore hole is kept open by the auger itself and the well casing is put down the center of the auger and left in place as the auger is withdrawn. The use of such augers is commonplace in the installation of groundwater monitoring wells. Further advantages to installing smaller wells is the speed at which they can be installed, the relatively small amount of contaminated soil removed from the holes which must be disposed of, and the ability to use the wells as monitoring and sampling points besides being used as recovery wells.

Another advantage of the present invention is that a total of 36 three-inch diameter wells, with six-inch diameter bore holes, or a total of 81 two-inch diameter wells, with four-inch diameter bore holes, can be installed in a given area with the same amount of soil removal as one 24-inch diameter well with a 36-inch diameter bore hole. Since it is common when using prior art systems to install a dozen monitoring wells to monitoring the success or failure of one large well, this brings the number of smaller wells which, in the present invention, can be drilled without removing more soil than would be removed by the use of prior art systems to about 0.50 three-inch wells and over 90 two-inch wells.

In the field of ground water cleanup, the depth to which a well may be drilled is sometimes limited by a clay layer in the soil. Since drilling through such a layer might contaminate water below the clay, the amount of space below the water table in a well taken by the recovery system should be minimized. While prior-art systems often required six feet or more of such space, the present apparatus needs less than three feet.

The primary object of the present invention is to provide an improved apparatus and a method for recovering liquid hydrocarbons which reside underground on the top of ground water wherein the hydrocarbon is made to flow into one or more small diameter wells built into the ground in a contaminated area and the liquid hydrocarbons are removed from the individual wells on a cyclical basis by separately drawing ground water (to produce a cone of depression) and liquid hydrocarbon up into chambers and then pushing the liquids to the surface using compressed air.

Other objects of this invention will become apparent as the following specification progresses, reference being had to the accompanying drawings for an illustration of several embodiments of the invention.

DESCRIPTION OF PREFERRED EMBODIMENTS

Figure 1:
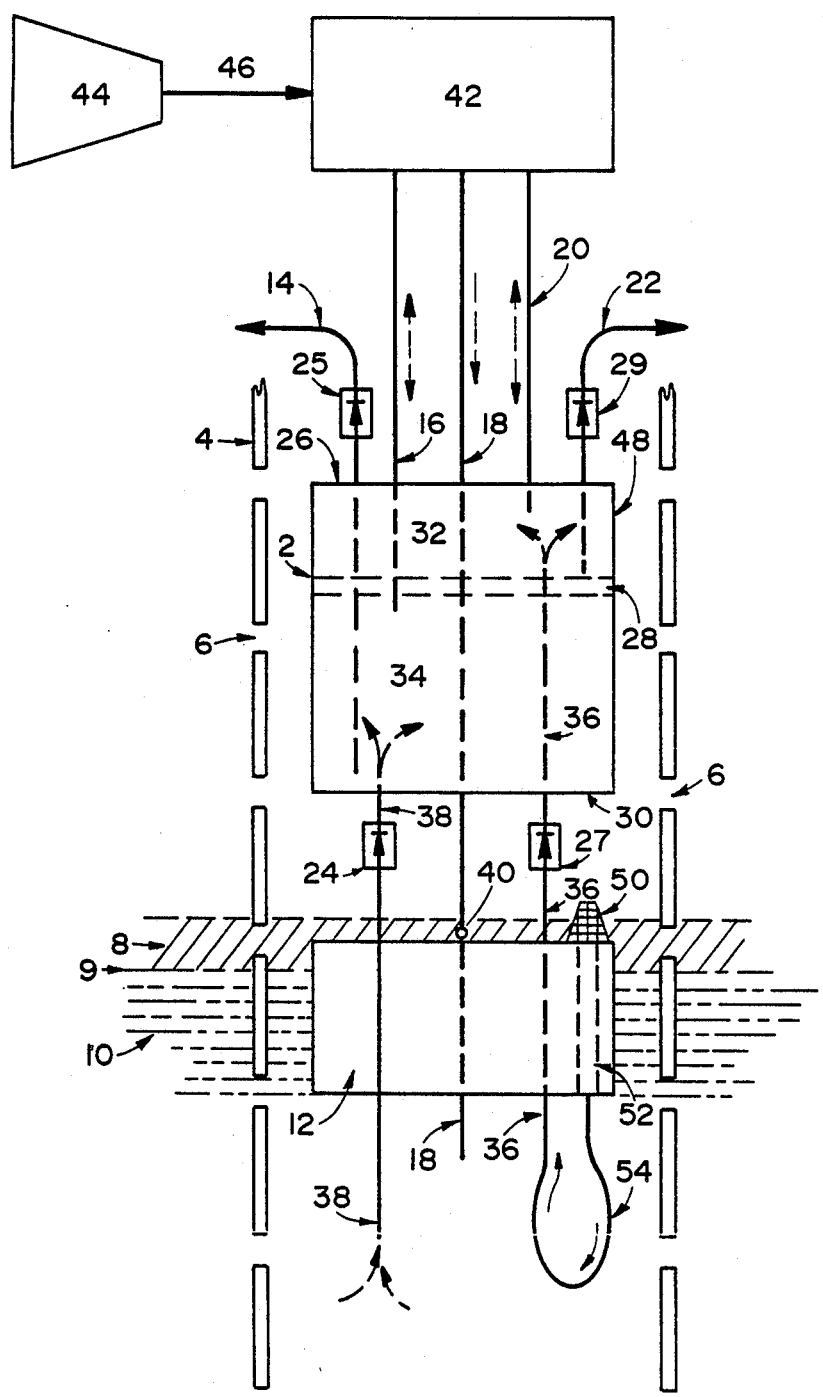
FIG. 1 is a system schematic showing the pump chambers suspended above an oil skimmer in a well casing. It also shows the pneumatic controls and air compressor. The conduits which pass air, water, and product are drawn schematically.

FIG. 1—Schematic Of Evacuation/Pressure System Removing Oil From An Oil Skimmer And Water From Below An Oil Skimmer In FIG. 1 pump chambers 2 is suspended via air, water, and liquid hydrocarbon conduits 14, 16, 18, 20, 22 in a well casing 4. The well casing 4 has slots 6 in its wall to allow fluids to pass into it. Below the pump chambers 2 is a liquid hydrocarbon skimmer 12 of the kind available from Clean Environment Engineers in Emeryville, Calif. The skimmer 12 is floating at the liquid-hydrocarbon/water interface 9. A liquid hydrocarbon layer 8 is floating on groundwater 10. The design of the skimmer 12 is such that it sinks in liquid hydrocarbon and floats on water. Its inlet 50 is at its uppermost extremity so only liquid hydrocarbon will enter. The skimmer 12 has a water conduit 38, a well level sensing conduit 18, and a liquid hydrocarbon conduit 36 loosely passing through its body. Since the conduits 38, 18, 36 loosely pass through the body of the skimmer 12, the skimmer 12 can rise and fall with the liquid-hydrocarbon/water interface 9 in the well casing 4.

Pneumatic controls 42 are situated outside the well casing 4 and are supplied with compressed air by a compressor 44 via an air line 46. The controls 42 govern the evacuation and pressurization of the water pump chamber 34 and the liquid hydrocarbon pump chamber 32. The chambers 32, 34 are connected to the controls 42 by air lines 16, 20. A well level sensing air line 18 runs from the controls 42 through the pump chamber's uppermost end plate 26, through the pump chamber's dividing plate 28 and out the pump chamber's lower end plate 30. The well level sensor air line 18 continues down through the skimmer 12. A small bubbler hole 40 is drilled into the sensing line 18. The location of this hole 40 determines the level at which the liquid hydrocarbon 8 and water 10 in the well casing 4 will be held. The pneumatic controls 42, using a low air pressure sensing circuit (shown in FIG. 3), senses a back pressure when the liquid hydrocarbon 8 and/or water 10 rise above the bubbler hole 40. This back pressure is used to activate the pneumatic circuit which evacuates and then pressurizes the water pump chamber 34.

When the water pump chamber 34 is evacuated, the controls 42 draw air from the chamber 34 through the water pump chamber air line 16. This causes water 10 to be drawn into the bottom of the water intake conduit 38, up through a one-way check valve 24, and into the water pump chamber 34. When the water pump chamber 34 is pressurized, the controls 42 force pressurized air through the water pump chamber air hose 16 into the water pump chamber 34. This drives the water in the chamber 34 up into the water discharge conduit 14, through a one-way check valve 25, and up out of the well casing 4 to a discharge point. The evacuation/pressurization cycle continues until the fluid level in the well casing 4 is drawn down to a few inches of the bubbler hole 40. Using this system a fluid level in the well casing 4 can be accurately maintained.

Liquid hydrocarbons 8 are removed from the well casing by evacuating and pressurizing the liquid hydrocarbon pump chamber 32. This is controlled by a pneumatic timing circuit (shown in Fig.4) located in the pneumatic controls 42. When the liquid hydrocarbon pump chamber 32 is being evacuated, air is drawn from the chamber 32 through the liquid hydrocarbon air line 20. This causes liquid hydrocarbon to be drawn into the skimmers inlet 50, down through the skimmer's liquid hydrocarbon passage 52, through a flexible tube 54, up through the liquid hydrocarbon intake conduit 36, through a one-way check valve 27, and up into the liquid hydrocarbon pump chamber 32. When the chamber 32 is pressurized the pneumatic controls 42 force compressed air down through the liquid hydrocarbon pump chamber air line 20 into the liquid hydrocarbon pump chamber 32. This drives the liquid hydrocarbon up into a liquid hydrocarbon discharge conduit 22, through a one-way check valve 29 and up out of the well casing 4 to a discharge point.

Figure 2:
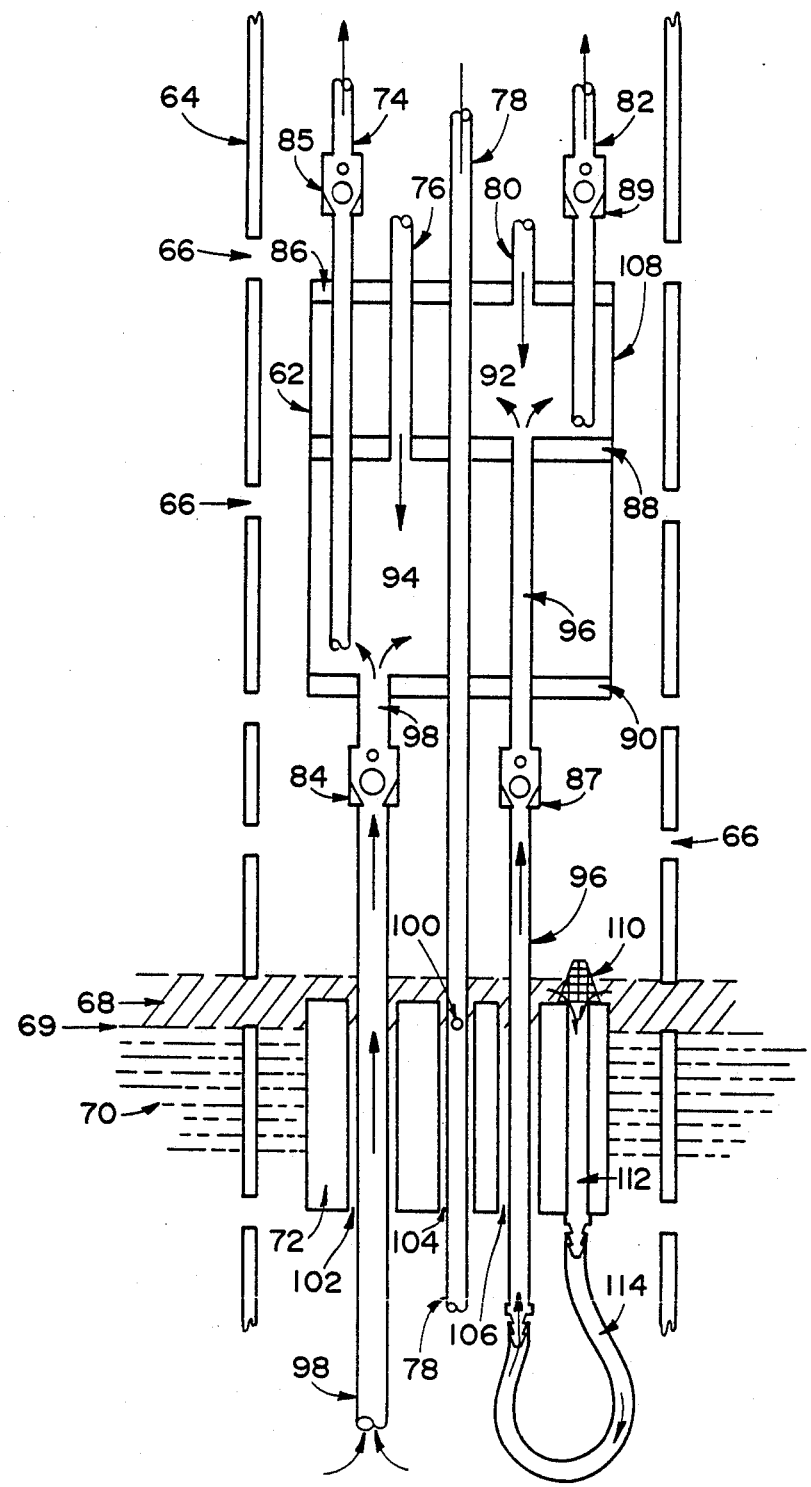
FIG. 2 is a vertical section of the pump chambers suspended above an oil skimmer in a well casing. The air, water, and liquid hydrocarbon conduits are clearly shown.

FIG. 2—Details of Evacuation/Pressure Pump Chambers And Floating Oil Skimmer In FIG. 2 pump chamber 62 is suspended via air, water, and liquid hydrocarbon conduits 74, 76, 78, 80, 82 in a well casing 64. The well casing 64 has slots 66 in its wall to allow fluids to pass into it. Below the pump chambers 62 is a liquid hydrocarbon skimmer 72 of the kind available from Clean Environment Engineers in Emeryville, Calif. The skimmer 72 is floating at the liquid-hydrocarbon/water interface 69. A liquid hydrocarbon layer 68 is floating on groundwater 70. The design of the skimmer 72 is such that it sinks in liquid hydrocarbon 68 and floats on water 70. Its inlet 110 is at its uppermost extremity so only liquid hydrocarbon will enter. The skimmer 72 has a water conduit 98, a well level sensing conduit 78, and a liquid hydrocarbon conduit 96 loosely passing through its body. Since the conduits 98, 78, 96 loosely pass through the body of the skimmer 72, the skimmer 12 can rise and fall with the liquid-hydrocarbon/water interface 69 in the well casing 64.

Pneumatic controls (not shown) are situated outside the well casing 64 and are supplied with compressed air by a compressor (not shown). The pneumatic controls govern the evacuation and pressurization of the water pump chamber 94 and the liquid hydrocarbon pump chamber 92. The chambers 92, 94 were connected to the pneumatic controls by air lines 76, 80. A well level sensing air line 78 runs from the pneumatic controls through the pump chamber's uppermost end plate 86, through the pump chamber's dividing plate 88 and out the pump chamber's lower end plate. This sensing line 78 is not open to the pump chambers 92, 94. The well level sensor air line 78 continues down through the skimmer 72. A small bubbler hole 100 is drilled into the sensing line 78. The location of this hole 100 determines the level at which the liquid hydrocarbon 68 and water 70 in the well casing 64 will be held. The pneumatic controls, using a low air pressure sensing circuit (shown in FIG. 3), senses a back pressure when the liquid hydrocarbon 68 and/or water 70 rise above the bubbler hole 100. This back pressure is used to activate the pneumatic circuit which evaluates and then pressurizes the water pump chamber 94.

When the water pump chamber 94 is evacuated, the pneumatic controls draw air from the chamber 94 through the water pump chamber air line 16. This causes water 70 to be drawn into the bottom of the water intake conduit 98, up through a one-way check valve 84, and into the water pump chamber 94. When the water pump chmber 94 is pressurized, the pneumatic controls force pressurized air through the water pump chamber air hose 16 into the water pump chamber 94. This drives the water in the chamber 94 up into the water discharge conduit 74, through a one-way check valve 85, and up out of the well casing 64 to a discharge point. The evacuation/pressurization cycle continues until the fluid level in the well casing 64 is drawn down to a few inches of the bubbler hole 10. Using this system a fluid level in the well casing 64 can be accurately maintained.

Liquid hydrocarbons 68 are removed from the well casing by evacuating and pressurizing the liquid hydrocarbon pump chamber 32. This is controlled by a pneumatic timing circuit (shown in FIG. 4) located in the pneumatic controls 92. When the liquid hydrocarbon pump chamber 92 is being evacuated, air is drawn from the chamber 92 through the liquid hydrocarbon air line 80. This causes liquid hydrocarbon to be drawn into the skimmers inlet 110, down through the skimmer's liquid hydrocarbon passage 112, through a flexible tube 114, up through the liquid hydrocarbon intake conduit 96, through a one-way check valve 87, and up into the liquid hydrocarbon pump chamber 92. When the chamber 92 is pressurized the pneumatic controls 92 force comprssed air down through the liquid hydrocarbon pump chamber air line 80 into the liquid hydrocarbon pump chamber 92. This drives the liquid hydrocarbon up into a liquid hydrocarbon discharge conduit 82, through a one-way check valve 89 and up out of the well casing 64 to a discharge point.

The location of the ends of the conduits 74, 76, 78, 80, 82, 96, 98 in the pump chambers 92, 94 is very important to maximize efficiecy. The end of the liquid hydrocarbon pump chamber's air conduit 80 is located flush with the underside of the pump chamber's uppermost end plate 86. This ensures little, if any, liquid hydrocarbon is drawn up into the conduit 80 since the entire liquid hydrocarbon pump chamber 92 must be filled before any liquid hydrocarbon would enter the conduit 80. If the end of this conduit 80 were lower in the chamber 92, liquid hydrocarbon could be drawn up into the conduit and the chamber 92 would cease to fill. Thus a certain volume of the chamber 92 would never be utilized which would reduce the efficiency of the system. Likewise the end of water pump chamber's air line 76 is located flush with the underside of the pump chamber's upper end plate 88.

The location of the end of the water intake conduit 98 is located flush with the upper side of the lower plate 90 to minimize lift distance and to minimize mixing of the water as it enters the water pump chamber 94. Likewise the liquid hydrocarbon intake conduit 96 is located flush with the upper side of the mid plate 88.

The location of the end of the water discharge conduit 74 is about one inside diameter of that conduit distance above the upper surface of the lower plate 90. This ensures almost all water wil be pushed from the water pump chamber 94 and yet allows ample area for fluid entry into the conduit 74. Likewise the end of the liquid hydrocarbon discharge conduit 82 is located about one inside diameter of that conduit distance above the upper surface of the mud plate 88.

It is also important that the air and fluid conduits 74, 76, 78, 80, 82, 96, 98 are tightly sealed (e.g., welded) from all pump chamber areas except where the ends of the conduits are open. That is, the water discharge conduit 74 is sealed from the liquid hydrocarbon pump chamber 92 where the conduit 74 passes through the pump chambers upper plate 86. It is also sealed from both the liquid hydrocarbon pump chamber 92 and the water pump chamber 94 where it passes through the pump chamber's end plate 88. The water discharge conduit 74 is open at its lowermost end, a short distance above the pump chamber's lowermost plate 90.

Likewise, the water pump chamber's air line 76 is sealed at the upper end plate 86 and at the upper side of the mid plate 88. The sensing air line 78 is sealed at all pump chamber plates 86, 88, 90. The liquid hydrocarbon pump chamber air line 80 is sealed at the upper side of the upper plate 86. The liquid hydrocarbon discharge line 82 is sealed through the upper plate 86. The water intake line 98 is sealed through the lower plate 90. The liquid hydrocarbon intake line is sealed through the lower plate 90 and mid plate 88. These sealings can be accomplished by welding if the pump is made of steel, pipe threads, or by O-ring seals where the conduits 74, 76, 78, 80, 82, 96, 98 pass through the plates 86, 88, 90.

Figure 3:
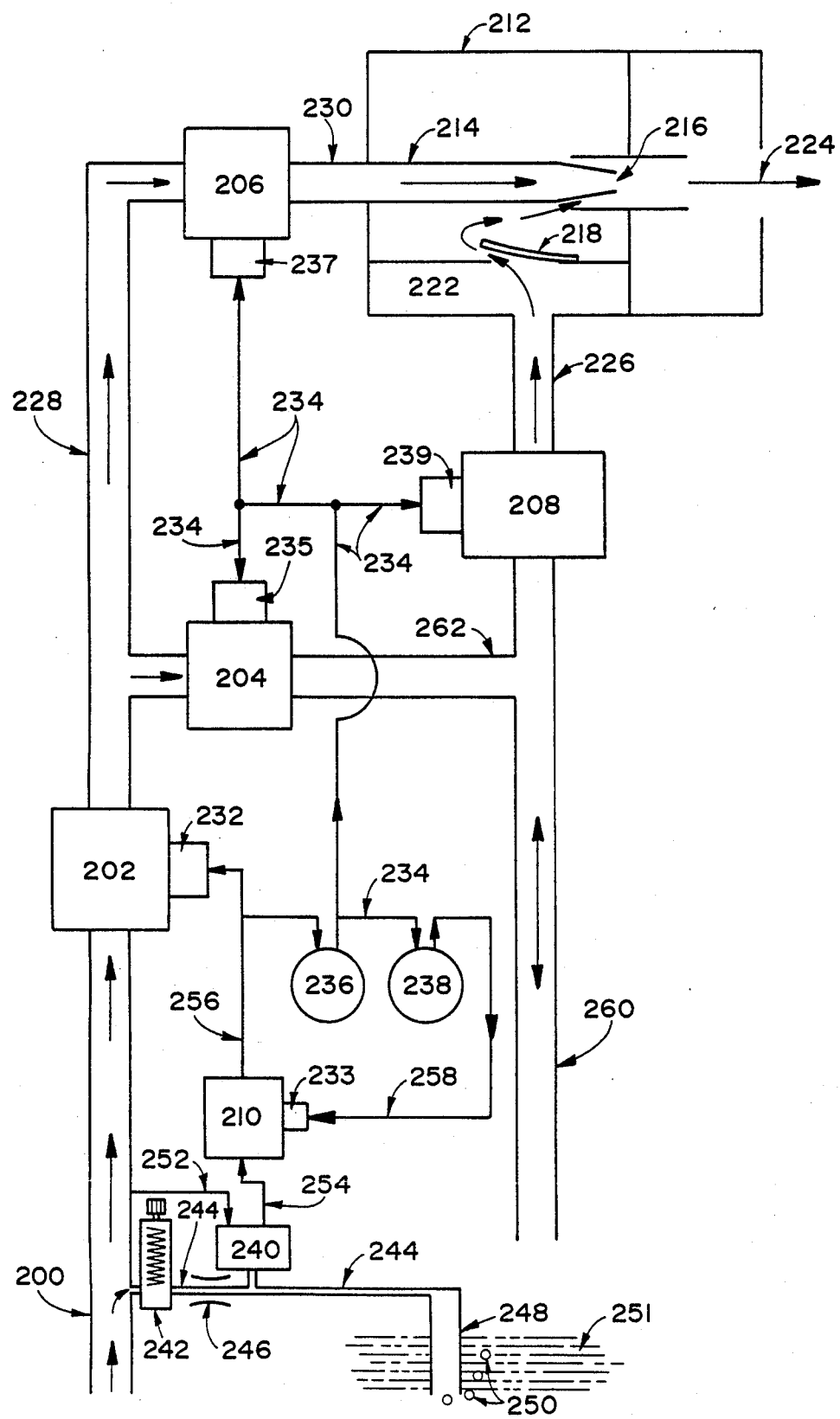
FIG. 3 is a schematic of the pneumatic circuit which controls the evacuation and pressurization of the water pump chamber.

FIG. 3—Schematic Of Pneumatic Circuit Controlling Water Pump

FIG. 3 presents the schematic of the pneumatic circuit which governs the evacuation and pressurization of the water pump chamber. Air which is pressurized to about 30 pounds per square inch (psi) or above enters conduit 200, branches to a low pressure regulator 242, a pneumatic amplifier 240, and enters a normally closed two-way main pressure pneumatic valve 202. From the low pressure regulator the air, now reduced to about 1 psi, passes through a small orifice 246 about 0.007 inches inside diameter and branches to the pilot input of the amplifier 240 and the well level sensing conduit 248. The slow bleed of low pressure air through the orifice 246 produces a slow stream of bubbles 250 when the end of the well level sensing conduit 248 is submerged in fluid 251. This submergence causes pressure to rise in the well level sensing conduit 248 to the amount necessary to push the fluid 251 out of the end of the conduit.

When the end of the well level sensing conduit 248 is sufficiently submerged to produce a back pressure which will activate the pilot of the amplifier 240, pressurized air is then passed through the amplifier via an amplifier outlet conduit 254 through a normally passing three-way, timer reset valve 210, out through the reset conduit 256 to the main pressure valve's pneumatic actuator 232 and also to the adjustable pressurization timer 236. Pressurized air now passes through the main valve discharge conduit to enter the two-way, normally passing pressurization valve 204 and the two-way, normally closed evacuation valve 206. The pressurized air passes through the normally passing pressurization valve 204 and out through the pressurization valve outlet conduit 262. The pressurized air then enters the water pump chamber air conduit 260 and passes to the water pump chamber (not shown), forcing all water out of the chamber. The pressurized air also branches to the inlet of a two-way normally closed evacuation intake valve 208. Since this valve 208 is never open when the pressurization valve 204 is open, no air passes through this evacuation inlet valve 208 at this point in the cycle.

When the pressurization timer 236 has completed its set cycle, it passes pressurized air to the adjustable evacuation timer 238, the pneumatic actuator 239 of the normally closed evacuator inlet valve 208, thus opening the valve 208, the pneumatic actuator 235 of the normally passing pressurization valve 204 thus closing the valve 204 and the pneumatic actuator 237 of the normally closed evacuator valve 206 thus opening the valve 206. Now pressurized air is routed through the evacuator valve 206 into the pneumatic evacuator 212 through the evacuator power inlet conduit 230. The pressurized air flows through the venturi 216 of the evacuator 212 drawing air from its outer chamber 222 through a flap valve 218 into the venturi 216. The combined volume of pressurized air and suctioned air is pushed out the evacuator exhaust 224. Since the evacuator inlet valve 208 is open and the pressurization valve 204 is now closed, the air in the water pump chamber air conduit 260 is drawn into the evacuator 212. This causes a reduction of pressure in the water pump chamber which draws water into the chamber.

When the evacuation timer 238 finishes its cycle, it passes pressurized air via the evacuation timer outlet conduit 258 to the pneumatic actuator 233 of the normally passing three-way timer reset valve 210. This closes the valve 210 and exhausts the air in the reset conduit 256 which causes the main pressure valve 202 to close due to loss on its actuator 232 and the pressurization timer 236 to reset due to loss of pressurized air. When the pressurizing timer 236 resets it exhausts all air from the pressurization valve outlet conduit causing the pressurization valve 204 to open and the evacuation valve 206 and the evacuator inlet valve 208 to close due to loss of air to their respective actuators 235, 237, 239. In addition, air to the evacuation timer 238 is exhausted and thus the air in the evacuation timer outlet conduit 258 and also the air to the reset timer actuator 233 is exhausted. This causes the reset valve 210 to open allowing pressurized air to again pass up into the circuit. If pressurized air is still flowing from the amplifier 240, the cycle will begin again and continue until the level of the fluid 251 is drawn down such that the back pressure in the well level sensing conduit 248 is reduced sufficiently as to not activate the amplifier 240.

Such spring return valves 202, 204, 206, and actuators 232, 233, 235, 237, 239, 208, 210 are available from many suppliers. One such supplier is the Clippard Minimatic Company in Cincinnati Ohio, U.S.A. Such evacuators 212 are available through PIAB in Akersberga, Sweden. Such amplifiers 210 are available through Norgren of Littleton, Colo., U.S.A. Such pneumatic timers 236, 238 are available through Ellis-Kuhnke Controls of Atlantic Highlands, N.J., U.S.A. Such low pressure regulators 242 and orifices 246 are available through Air Logic of Racine, Wis., U.S.A.

Figure 4:
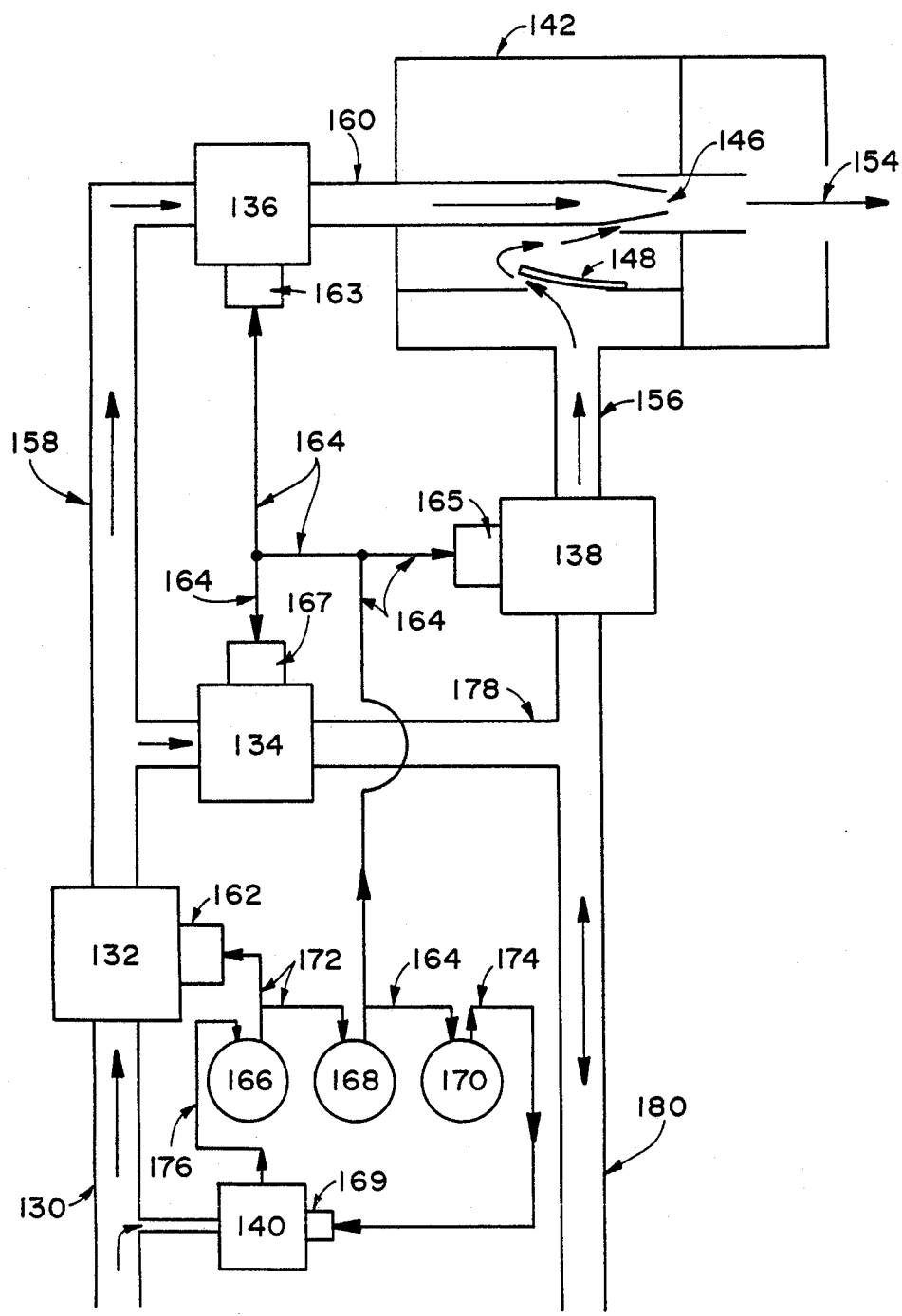
FIG. 4 is a schematic of the pneumatic circuit which controls the evacuation and pressurization of the liquid hydrocarbon pump chamber.

FIG. 4—Schematic Of Pneumatic Circuitry Controlling Hydrocarbon Pump

The pneumatic circuitry which governs the evacuation and pressurization of the liquid hydrocarbon pump chamber is shown in FIG. 4. This circuit is activated via adjustable timers 166, 168, 170. Pressurized air flows into the circuit via the inlet conduit 130 and branches to enter the normally passing three-way timer reset valve 140 and the normally closed two-way, main air valve 132. Pressurized air now passes to the adjustable "off" timer 166 through the reset conduit 176. After this "off" timer has cycled pressurized air is passed to the main air valve's actuator 162 via the "off" timer outlet conduit 172, thus opening the main valve 132. It also passes pressurized air via the same conduit 172 to the adjustable evacuation timer 168 which then begins its timing cycle. Pressurized air now passes through the main valve outlet conduit 158 branching to the inlet of the normally closed two-way pressurization valve 134 and the inlet of the normally passing two-way evacuation valve 136. Air passes through the evacuation valve 136 and into the pneumatic evacuator 142 via the evacuator air power conduit 160. Thus the action of the evacuator's venturi 146 causes air to be drawn into the evacuator 142 through its flap valve 148. Such air is drawn through the normally open, two-way evacuator inlet valve 138 via the evacuator inlet conduit 156. This air comes into the evacuator inlet valve 138 via the liquid hydrocarbon pump chamber air conduit 180. This causes the pressure in the liquid hydrocarbon pump chamber (FIG. 2) to be reduced and liquid hydrocarbons to be drawn up into the liquid hydrocarbon pump chamber where it will remain until pressurized out. A vacuum is also drawn on the outlet side of the pressurization valve 134, but since this valve 134 is never open when the vacuum is being drawn nothing passes through this valve 134 at this point in the cycle.

When the evacuation timer 168 has completed its cycle it passes air to the pressurization timer 170 to begin its timing cycle and to the pneumatic actuator 163 in the evacuator power inlet valve 136, closing it, the pneumatic actuator 165 on the evacuator inlet valve 138, closing it, and the actuator 167 on the pressurization valve 134, opening it. This air is passed via the evacuation timer outlet conduit 164. Pressurized air now passes through the pressurization valve 134 and out to the liquid hydrocarbon pump chamber air line 180 via the pressurization outlet conduit 178. The pressurized air now flows to the liquid hydrocarbon pump chamber and pushes the liquid hydrocarbon up out of the pump.

When the pressurization timer 170 finishes its cycle it passes pressurized air to the actuator 169 of the three-way normally open timer rest valve 140 closing it and exhausting the reset valve outlet conduit. This in turn exhausts the air applied to all pneumatic timers 166, 168, 170, causing them to reset, and all actuators 162, 163, 165, 167, and 169 causing the valves to return to their normal position. At this point the timer reset valve 140 is passing air again which starts the cycle again. The cycle is adjusted by adjusting the length of time on the timers. The "off" cycle is adjusted to match the influx of liquid hydrocarbons into the well.

CONCLUSIONS

Thus it is seen that liquid hydrocarbon and water can be removed from a well casing using a simple canister pump fitted with check valves by periodically evacuating and pressurizing the canister.

The advantages of this system over the prior art is that the pump canister need not be submerged to pump fluid. This decreases the necessary well depth since only a portion of a simple specific gravity skimmer or the like need be submerged in fluids in the well casing. This is of vital importance to the oil spill clean-up industry because very often a water-sealing clay lens of earth, which protects the deeper lying groundwater from contamination, cannot be pierced. This is prohibited by law in many states. Thus, if the well can only be so deep and the maximum amount of groundwater drawdown is desired to enhance flow of pollutant to the well, there exists a minimum amount of well casing available for submergence of liquid hydrocarbon removal equipment. This invention precisely fills that need.

Further, this invention is powered and controlled entirely by compressed air which eliminates the sparking hazards of electrically powered components.

RAMIFICATIONS

The proposed invention will render to the underground oil spill clean-up industry an alternative method of removing spilled liquid hydrocarbon from underground spills. To date only submersible pumps or above-ground suction pumps have been available to the industry. The proposed invention will render a pumping system capable of removing liquids from wells at depths beyond the reach of suction pumps. In rendering such alternatives to the industry the natural environmental safeguard of clay lens need not be disturbed to facilitate the removal of liquid hydrocarbons and contaminated groundwater from the uppermost situated aquifiers.

What is claimed is:

1. Apparatus for recovery of liquid hydrocarbon floating on water, comprising:

a pneumatically operated and powered pumping system; said system having a pneumatic control unit and a pump which are connected by a plurality of air-tight, hollow conduits; said pump having two separate chambers, one for pumping liquid hydrocarbons and the other for pumping water; said chambers each having an upper extremity and a lower extremity and a check valve which allows liquid to enter from said chamber's lower extremity and exit from said chamber's upper extremity in a one-way, upwardly-directed path;

each of said chambers having at least one said air-tight, hollow conduit which has an open end stop within said chamber; said conduit thereby providing an air passage to said pneumatic controls by which said chambers are evacuated and pressurized; said pneumatic control unit including vacuum generating means for causing said pump to fill with liquid and then supply pressurized air to said pump to force said liquids up, out of said pump; said pump having means for suspending it above the level of said water so as to draw liquid up to it through said conduits from below; and a liquid hydrocarbon recovery unit comprising a floating body with an uppermost extremity, a lowermost extremity and several vertical bores and a flexible hollow tube through its body; one of said bores serving as a liquid hydrocarbon inlet at said floating body's uppermost extremity and a liquid hydrocarbon outlet at its lowermost extremity; said outlet being rigidly attached to said flexible hollow tube, said flexible hollow tube extending downward and then looping upward to pass slidingly through one of said bores in said floating body and then up, said tube being rigidly attached to said inlet of said hydrocarbon pumping chamber of said pump, and means for positioning said pump above said liquid hydrocarbon recovery unit.

2. Apparatus as set forth in claim 1, further including a venturi pneumatic vacuum pump located in said pneumatic control unit.

3. Apparatus as set forth in claim 2, further including at least three liquid hydrocarbon pneumatic pumping timers; a first of said timers one being an evacuation timer, a second being a pressure timer, and the third being an off timer; said off timer, when its time is expended, being arranged to operate said pneumatic valves in said pneumatic control unit which pass air to activate said venturi pneumatic vacuum pump and said evacuation timer, thereby causing said hydrocarbon pumping chamber to be evacuated and fluid to be drawn into said chamber; said evacuation timer, after expending its time, being arranged to activate said pneumatic valves in said pneumatic control unit to shut off air to said venturi pneumatic pump and to pass pressurized air to said hydrocarbon pump and activate said pressure timer, thereby causing said hydrocarbon pumping chamber to be pressurized and said fluid to be discharged thereby; said pressure timer, after expending its time, being arranged to pass air to cease passing pressurized air to said hydrocarbon pumping chamber and activate said off timer; thereby causing said system to stop pumping and thus allow liquid hydrocarbons to build up in said well casing.

4. Apparatus for recovery of liquid hydrocarbons floating on water, comprising:
a pneumatically operated and powered pumping system; said system having a pneumatic control unit and a pump which are connected by a plurality of air-tight, hollow conduits; said pump having two separate chambers, one for pumping liquid hydrocarbons and the other for pumping water; said chambers each having an upper extremity and a lower extremity and check valves positioned at its inlet and at its discharge, respectively, to allow liquid to enter said chamber from its lower extremity and exit from its upper extremity in a one-way, upward direction;
each of said chambers each having at least one said air-tight, hollow conduit which has an open end within said chamber; said conduit being the air passage to said pneumatic control unit by which said chambers are evacuated and pressurized; said pneumatic control unit including a vacuum generating means for causing said pump to fill with liquid and then supply pressurized air to said pump to force said liquids up, out of said pump; said pump having means for suspending it above the level of said water so as to draw liquid up to it through conduits from below;
a liquid hydrocarbon recovery unit comprising a floating body with an upper extremity, a lower extremity and several vertical bores and a flexible hollow tube through its body; one of said bores serving as a liquid hydrocarbon inlet at said floating body's uppermost extremity and also serving as the liquid hydrocarbon outlet at its lowermost extremity; said outlet being attached to said flexible hollow tube, said flexible hollow tube extending dowwnard and then looping upward, to pass slidingly through one of said bores in said floating body and then traveling up to be rigidly connected to said inlet at said pump's liquid hydrocarbon pumping chamber; and
another of the said air-tight, hollow conduits passing through said pump and extending down for placement in said water; said conduit extension being open at its lower end and connected to said pneumatic control unit at its other end; said conduit extension thereby being able to transmit pneumatic pressure exerted by liquids against said open end of said conduit to activate the pumping of said water.

5. Apparatus as set forth in claim 4, further including a venturi pneumatic vacuum pump located in said pneumatic control unit.

6. Apparatus as set forth in claim 5, further including at least three pneumatic liquid hydrocarbon pumping timers; a first of said timers being an evacuation timer, a second being a pressure timer, and the third being an off timer; said off timer, when its time is expended, being arranged to operate said pneumatic valves in said pneumatic control unit which pass air to activate said venturi pneumatic vacuum pump and said evacuation timer, thereby causing said hydrocarbon pumping chamber to be evacuated and fluid to be drawn into said chamber; said evacuation timer after expending its time, being arranged to activate said pneumatic valves in said pneumatic control unit to shut off air to said venturi pneumatic pump, activate said pressure timer, and to pass pressurized air to said hydrocarbon pump, thereby causing said hydrocarbon pumping chamber to be pressurized and said fluid to be discharged; said pressure timer, after expending its time, being arranged to activate said pneumatic valves to cease passing pressurized air to said hydrocarbon pumping chamber and activate said off timer, thereby causing said system to stop pumping and thus allow liquid hydrocarbons to build up again in the vicinity of said pump.

7. Apparatus as set forth in claim 6, further including two additional pneumatic timers, a first being an evacuation timer and a second being a pressurization timer, a pneumatic amplifier, and pneumatic valves; means for connecting said amplifier to receive pneumatic pressure exerted by said liquids; upon sensing said pneumatic pressure due to a rise in said liquids, said amplifier including means for passing air to open said pneumatic valves which pass air to said venturi pneumatic pump and activating said evacuation timer; thus drawing water into said water pumping chamber; said evacuation timer, after expending its time, being arranged to activate said pneumatic valves to cease passing air to said venturi pneumatic pump, and to activate said pressurization timer and to activate said pneumatic valves to pass pressurized air to said water pumping chamber, thus forcing the water out of said chamber; said pressurization timer, after expending its time, being arranged to activate said pneumatic valves to cease passing pressurized air to said water pump chamber and to activate said pneumatic valves to exhaust pressurized air to said timers, thus re-setting them and allowing the cycle to begin again.

* * * * *